Aug. 17, 1954   J. C. KALAUS ET AL   2,686,394
MECHANICAL RAKE FOR USE WITH STONE PICKING DEVICES
Filed June 19, 1952   3 Sheets-Sheet 2
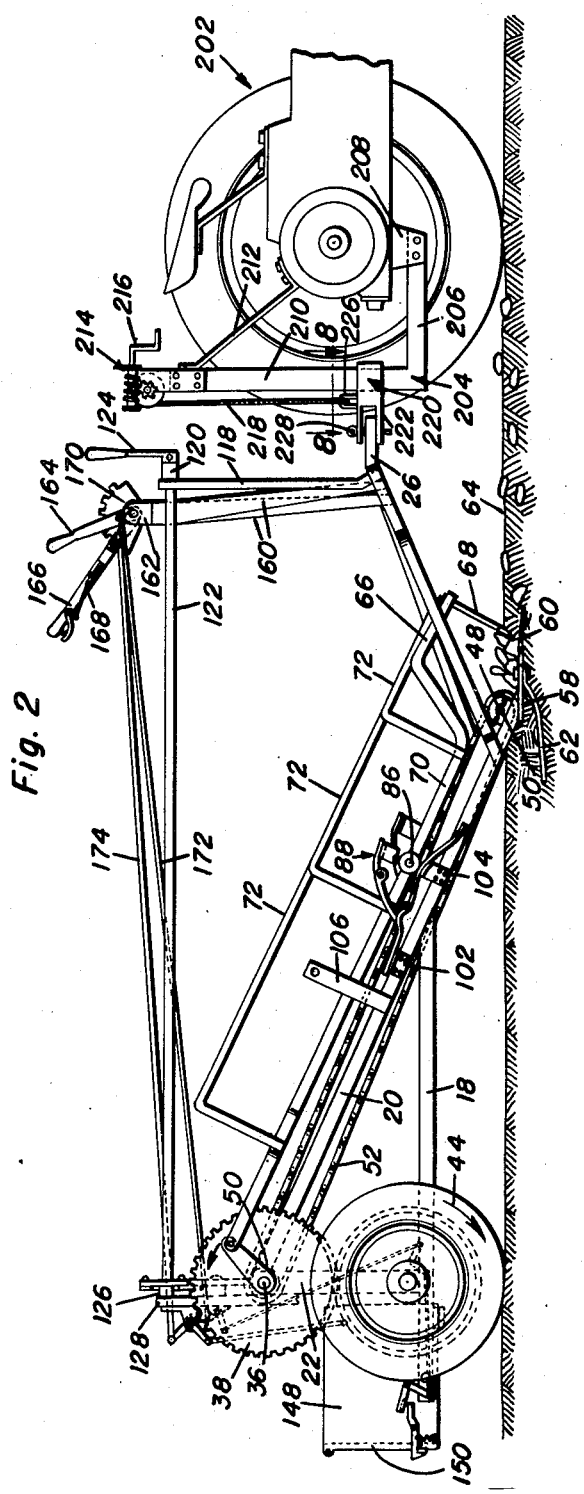
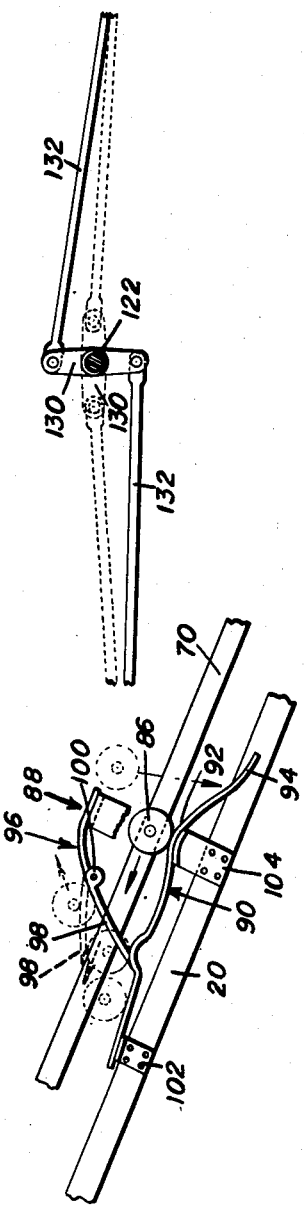
John C. Kalaus
John Kalaus
INVENTORS

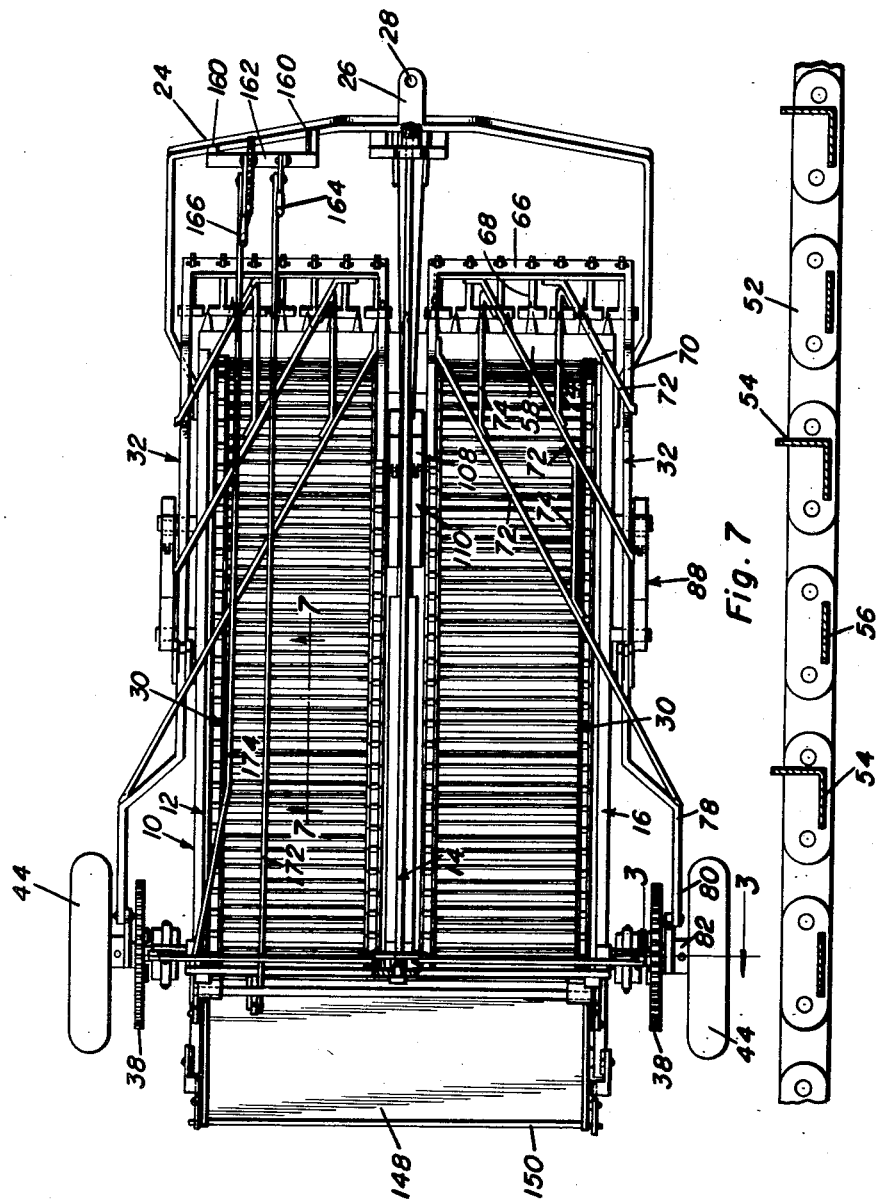

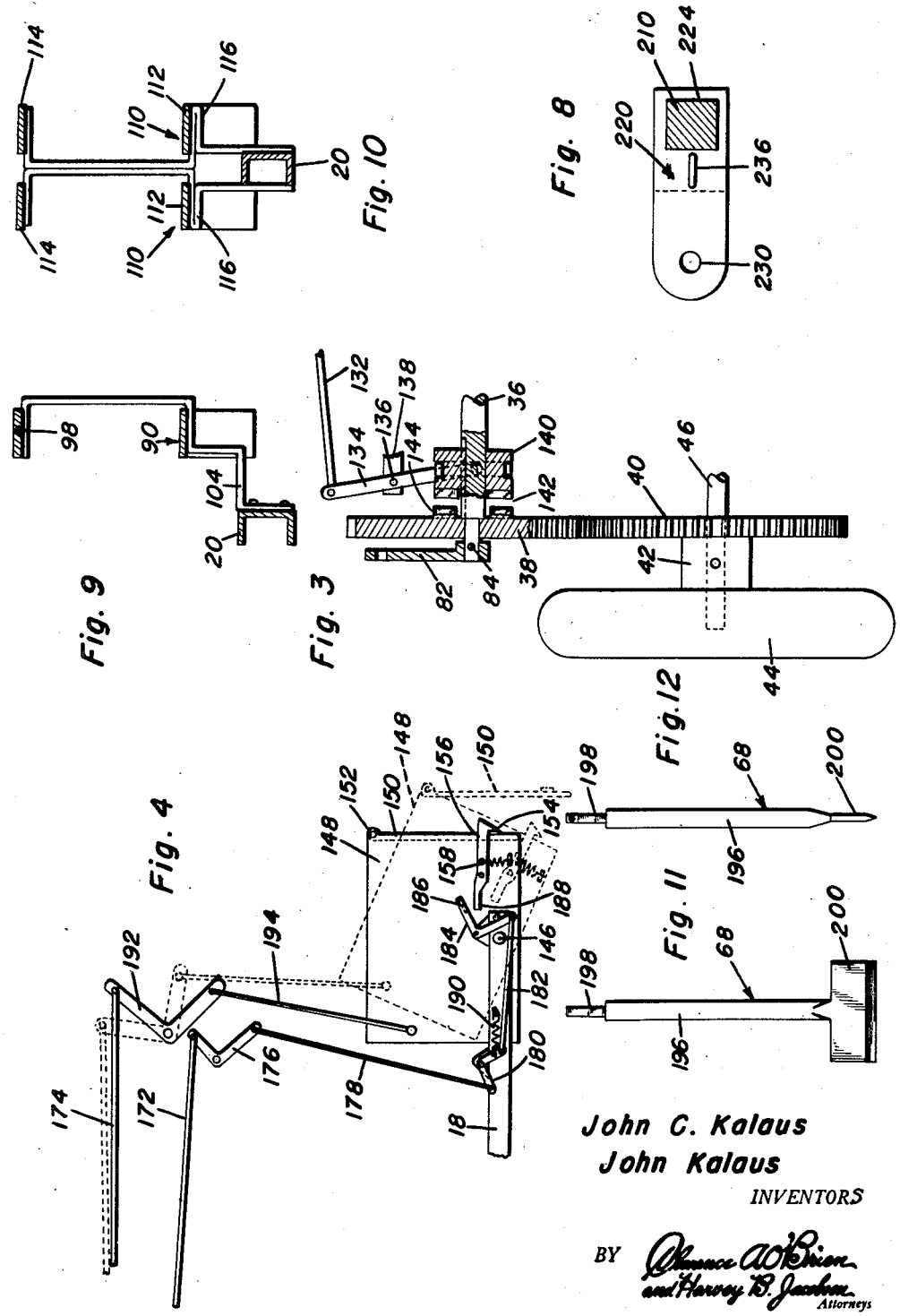

UNITED STATES PATENT OFFICE 2,686,394

MECHANICAL RAKE FOR USE WITH STONE PICKING DEVICES

John C. Kalaus and John Kalaus, Grey-Eagle, Minn., assignors of one-third to Mary C. Kalaus, Grey-Eagle, Minn.

Application June 19, 1952, Serial No. 294,462

3 Claims. (Cl. 55—17)

This invention relates in general to farm implements, and more particularly to a device for removing stones from fields.

The primary object of this invention is to provide an improved stone picker which may be conveniently drawn behind a tractor and engage the top soil of a field for effectively removing stones therefrom.

Another object of this invention is to provide an improved stone picker which is intended to be drawn by a tractor and having stone removal means driven by wheels thereof, said stone removal means including a conveyor and a stone rake for urging the stones onto said conveyor.

Another object of this invention is to provide an improved drive means for stone pickers, said drive means including a first gear mounted on a wheel of the stone picker, a second gear mounted on a conveyor drive shaft, said second gear being in engagement with said first gear and connected to the drive shaft by clutch means.

Another object of this invention is to provide an improved stone picker which includes a novel rake structure for urging stones dug out of the ground onto an associated conveyor, said rake being reciprocated along the longitudinal axis of the stone picker and being engaged with guide means which raises the same out of engagement with the ground during the forward stroke thereof.

Another object of this invention is to provide an improved hitch means for attaching a stone picker to a tractor, said hitch means including a drawbar which is vertically adjustable whereby the relationship of the forward end of the stone picker with respect to the ground may be varied as desired.

A further object of this invention is to provide an improved stone picker having the stone receptacle on the rear end thereof, said stone receptacle being provided with means for emptying the same, said means being controllable from an operator of the tractor drawing the stone picker whereby the stones picked up may be dumped in a pile as desired.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a top plan view of the stone picker, which is the subject of this invention, and shows the general construction thereof;

Figure 2 is a side elevational view of the stone picker of Figure 1 and shows the manner in which it may be adjustably supported by a tractor, only a rear portion of the tractor being shown, said tractor being provided with a vertically adjustable drawbar;

Figure 3 is an enlarged fragmentary transverse vertical sectional view taken substantially upon the plane indicated by the section line 3—3 of Figure 1 and shows the manner in which a drive shaft of the stone picker may be selectively driven by one wheel of the stone picker;

Figure 4 is an enlarged fragmentary side elevational view of the rear portion of the stone picker and shows the manner in which a stone receptacle may be emptied, the stone receptacle being shown in an emptying position by dotted lines, the frame and other portion of the upper part of the stone picker being omitted for purposes of clarity;

Figure 5 is an enlarged fragmentary longitudinal vertical sectional view taken adjacent a side rail of the stone picker and shows the construction of a guide engageable with a supporting roller of the rake for automatically raising the rake during a forward stroke thereof, alternate positions of the roller being shown by dotted lines;

Figure 6 is an enlarged fragmentary transverse vertical sectional view through the rear portion of a shaft for controlling clutch means for selectively engaging the drive means of the stone picker;

Figure 7 is an enlarged fragmentary transverse vertical sectional view taken substantially upon the plane indicated by the section line 7—7 of Figure 1 and shows the general construction of a portion of one of the conveyors;

Figure 8 is an enlarged transverse horizontal sectional view taken substantially upon the plane indicated by the section line 8—8 of Figure 2 and shows the general outline of the vertically adjustable drawbar of the tractor;

Figure 9 is an enlarged transverse vertical sectional view taken through one of the outer guides for the rakes of the stone picker and shows the general construction thereof;

Figure 10 is a fragmentary transverse vertical sectional view similar to Figure 9 and taken through a central frame member of the stone picker and showing the general arrangement of a central guide for the rake;

Figure 11 is an enlarged front elevational view of one of the rake tines and shows the general construction thereof; and Figure 12 is a side elevational view of the rake tine of Figure 11.

Similar characters of reference designate similar or identical elements and portions throughout the specification and throughout the different views of the drawings.

Referring now to the drawings in detail, it will be seen that the stone picker, which is the subject of this invention, includes a frame, which is referred to in general by the reference numeral 10. The frame 10 includes a first outer frame section 12, a central frame section 14, and a second outer frame section 16. Each of the frame sections is triangular in elevation and is formed of channel members. Each frame section includes a bottom horizontal frame member 18 which is connected at its forward end to an upwardly and rearwardly extending upper frame member 20, the forward end of the frame member 20 extending downwardly and forwardly of the forward end of the horizontal frame member 18. The upper rear end of the frame member 20 is connected to the horizontal frame member 18 by a vertical frame member 22. The vertical frame member 22 has its lower end connected to the horizontal frame member 18 at a point forward of the end thereof. It will be understood that the rear ends of the frame sections 12, 14 and 16 are connected together and that the rear end of the frame section 14 differs from the rear ends of the frame sections 12 and 16 in that the horizontal frame member 18 of the central frame section 14 terminates at its connection with its associated vertical frame member 22. The forward ends of the frame sections 12 and 16 are connected together by an inverted generally U-shaped tongue 24 which extends forwardly and upwardly from the frame sections 12 and 16. The central frame section 14 is provided with an upwardly and forwardly directed tongue member 26 which is connected to the tongue 24 and has a portion thereof extending forwardly thereof, the forwardly extending portion of the tongue member 26 being provided with an aperture 28 for receiving a pin for connecting the same to the tow bar.

As is best illustrated in Figure 1, the stone picker is divided into two halves with each half including a conveyor, which is referred to in general by the reference numeral 30 and a rake which is referred to in general by the reference numeral 32. Inasmuch as both halves of the stone picker are identical with the exception that there are left and right halves, only the right half of the stone picker will be described in detail.

The upper ends of the frame members 22 of the frame sections 14 and 16 are provided with bearings of a conventional type in which a drive shaft 36 is mounted for rotation. The drive shaft 36 has an outer end portion which extends outwardly of the frame section 16 and has mounted on a reduced outer end portion thereof a driven gear 38. As is best illustrated in Figure 3, the driven gear 38 is in vertical alignment with a driving gear 40 and is in engagement with the same. The driving gear 40 is secured to a hub 42 of a wheel 44, the wheel 44 providing supporting means for the rear of the stone picker and being mounted on an axle 46 carried by the frame 10.

Carried by the upper frame members 20 of the central frame section 14 and the other frame section 16 are a pair of bearings in which is mounted for rotation an idler shaft 48. Both the drive shaft 36 and the idler shaft 48 are provided with sprockets 50 adjacent their associated frame members 20, the sprockets 50 having entrained thereover continuous chains 52. Extending between and secured to alternate links of the chains 52 are bars forming the main portion of the conveyor 30. The bars include a first type in the form of an upwardly opened angle bar 54 and a flat bar 56. It will be noted as is best illustrated in Figure 7, that the bars 54 and 56 are alternated and in spaced parallel relation whereby smaller stones may drop between the bars and larger stones up to the size of the spacing between adjacent angle bars 54 may be handled by the conveyor 30.

Extending between and secured to the forward ends of the frame members 20 of the frame sections 14 and 16 is a horizontal plate 58 which is provided with a plurality of forwardly extending ground engaging teeth 60. Certain of the ground engaging teeth 60 have secured thereto downwardly and rearwardly extending runners 62 which pass through the ground below the surface thereof and aid in the support of the front end of the stone picker. It will be noted that the plate 58 and its spikes 60 are also disposed below the level of the ground 64 so as to dig out stones therein. As the stones are dug out of the ground they are moved rearwardly into engagement with the front end of the conveyor 30 and piled upon the plate 58. In order that the stones piled on the plate 58 may be moved onto the associated conveyor 30, the fork 32 has been provided.

As is best illustrated in Figures 1 and 2, the fork 32 includes a generally U-shaped front portion 66 to which is connected a plurality of downwardly and rearwardly extending tines 68. The U-shaped portion 66 has connected thereto a rearwardly extending drag link 70 which is connected to an outer side thereof. The U-shaped front portion 66 is braced with respect to the drag link 70 by a plurality of diagonal braces 72 and a plurality of longitudinally extending braces 74. The drag link 70 includes an offset rear portion 78 which is connected by a pin 80 to a crank arm 82. As is best illustrated in Figure 3, the crank arm 82 is mounted on the outer end of the drive shaft 36 and connected thereto by a pin 84 for rotation therewith. It will be understood that as the drive shaft 36 rotates in response to rotation of its associated wheel 44, the crank arm 82 also rotates and imparts a reciprocating motion to the rake 32.

Referring now to Figure 5 in particular, it will be seen that the drag link 70 is provided with a roller 86 which is in engagement with a cam trackway, the cam trackway being referred to in general by the reference numeral 88 and it is supported by an adjacent upper frame member 20. The cam trackway 88 includes a lower track section 90 which has a raised central portion 92 and a lower front end 94. Engagement of the roller 86 with these two portions of the trackway 90 permits the tines 68 mounted at the forward end of the rake 32 to engage the ground 64 at the forward end of its stroke and to move upwardly and rearwardly over the forward end of the conveyor 30 adjacent the beginning of its rearward stroke. The cam trackway 88 also includes an upper track 96 which overlies the lower track 90 and is engaged by the roller 86 on its forward stroke to raise the lower ends of the tines 68 out of engagement with the forward end of the conveyor 30 while positioned over the same. The upper track 96 terminates at a point where the tines 68 have reached the forward end of the conveyor 30 when the roller 86 has reached the forward end of the track 96 whereby the tines 68 are dropped down to a position adjacent the forward end of the plate 58.

In order that the roller 86 may pass the track 96 during the rearward stroke of the same, the upper track 96 is provided with a lower section 98 which is hingedly engaged with the upper portion thereof by hinge 100. As the roller 86 moves rearwardly, the same strikes the lower section 98 and moves it to the position illustrated in dotted lines. After the roller 86 has moved past the section 98 of the upper track 96, the section returns to its normal position and is ready to engage the roller during its forward stroke.

It will be noted that the rear end of the lower track 90 is supported from the frame member 20 by an angle bracket 102 secured thereto. The upper track 96 is supported at its forward end and the lower track 90 is supported adjacent the forward end thereof by a single bracket 104 which is carried by the frame member 20 forward of the bracket 102. As is best illustrated in Figure 9, the bracket 104 is angulated and has a general Z-shaped lower section and a channel shaped upper section with the tracks 90 and 96 being supported on what might be called channel shaped upper portion.

Referring now to Figure 2 in particular, it will be seen that in order to limit movement of the drag link 70 in a vertical plane, the frame member 20 of the frame section 16 is provided with a pair of outwardly extending transversely spaced parallel bars 106, one of the bars being disposed on each side of the drag link 70. It will be noted that the bars 106 are connected to the frame member 20 rearwardly of but adjacent to the bracket 102.

Referring now to Figure 1 in particular, it will be seen that the rear end of the inner leg portion of the U-shaped portion 66 of the rake 32 is provided with a second roller 108 which is in engagement with a cam trackway, which is referred to in general by the reference numeral 10. It will be understood that the cam trackway 110 is similar to the cam trackway 88 and is supported by the upper frame member 20 of the central frame section 14. It will be noted that the cam trackway 110 is positioned further forward than is the cam trackway 88 due to the shortness of the leg of the U-shaped front portion 66 to which the roller 108 is attached.

Referring to Figure 10 in particular, it will be seen that the trackway 110 includes a lower track 112 and an upper track 114 which are secured to the frame member 20 by an angulated bracket 116. It will be noted that a similar cam trackway is mounted on the other side of the frame member 20 and is utilized in combination with the rake 32 at the left side of the stone picker.

Referring now to Figures 1 and 2 in particular, it will be seen that secured to the tongue member 26 adjacent its intersection with the U-shaped tongue 24 and extending upwardly therefrom is a standard 118. Carried by the upper end of the standard 118 is a journal 120 in which is supported a forward end of a rotatable control shaft 122. Rigidly secured on the forward end of the control shaft 122 is a handle 124 for rotating the same. The rear end of the control shaft 122 is mounted in a journal 126 carried by an upwardly extending plate 128 which extends transversely of the frame 10.

Referring now to Figure 6 in particular, it will be seen that the rear portion of the control shaft 122 has mounted thereon a crank arm 130 whose end portions have pivotally connected thereto drag links 132. It will be seen that as the control shaft 122 is rotated the crank arm 130 is rotated to a horizontal position from its normal vertical position and the drag links 132 are urged apart.

Referring now to Figure 3 in particular, it will be seen that the outer end of each of the drag links 132 is pivotally connected to an upper end of another crank arm 134. The crank arm 134 is pivotally connected intermediate its ends by pivot pin 136 to a frame member 138. The lower end of the crank arm 134 is connected to a clutch member 140 mounted on the drive shaft 36 and connected thereto by a spline connection. The clutch member 140 is provided with teeth 142 on the outer face thereof and is adapted for longitudinal movement along the shaft 36. Carried by the driven gear 38 are complementary teeth 144 with which the teeth 142 may be engaged. It will be seen that when the drag link 132 is moved towards the center of the stone picker that the clutch member 140 is moved outwardly into engagement with the teeth 144. It will be understood that when the teeth 142 and 144 are disengaged, that the wheels 44 are free to rotate without driving either the conveyor 30 or the rake 32.

Extending between and pivotally connected to the rear ends of the lower frame members 18 of the outer frame sections 12 and 14 by pivot pins 146 is a stone receptacle 148 in the form of an elongate generally rectangular box. The stone receptacle 148 is provided with an open upper end and is disposed below the rear end of the conveyors 30. The stone receptacle 148 includes a rear side 150 which is hingedly connected to the adjacent ends thereof by a hinge construction 152. The rear side 150 has projecting outwardly from one side edge thereof adjacent the bottom thereof a flat keeper member 154 with which is engaged a latch member 156. The latch member 156 is urged downwardly by a spring 158 connected thereto.

Referring now to Figures 1 and 2 in particular, it will be seen that the left side of the front part of the U-shaped tongue 24 is provided with a pair of upstanding standards 160 which have extending between and connected to the upper ends thereof a transverse horizontal bar 162. Pivotally connected to the bar 162 for movement in a vertical plane is a first lever 164 and a second lever 166. It will be noted that the lever 166 differs from the lever 164 in that it is provided with a brake mechanism 168 engageable with a sector rack 170 rigidly secured to the transverse bar 162. Connected to the levers 164 and 166 and extending rearwardly therefrom are drag rods 172 and 174, respectively.

Referring once again to Figure 4 in particular, it will be seen that the drag rod 172 is connected to one leg of a crank arm 176, the crank arm 176 being pivotally connected at the rear of the frame 10. Extending downwardly from the other leg of the crank arm 176 is a drag link 178 which is connected to one leg of a crank arm 180 pivotally mounted on its associated frame member 18 of the frame section 12. Connected to the other leg of the crank 180 is a link 182 which is in turn connected to one leg of a crank arm 184. The crank arm 184 is pivotally connected at the extreme end of the frame member 18 and is provided with a transversely extending bar 186, the bar 186 being adapted to engage a rearwardly extending portion 188 of the latch 156 for moving the same to an inoperative position. It will be noted that the bar 186 is normally retained in an inoperative position by a spring 190 connected to one leg of the crank arm 180. It will be seen that when the lever 164 is moved forwardly, the bar 186 is moved downwardly into engagement with the rearwardly extending portion 188 and the front end of the latch 156 is moved upwardly whereby the rear side 150 is permitted to swing to an open position.

The rear end of the drag rod 174 is connected to one leg of a crank arm 192 which is also pivotally mounted at the upper rear of the frame 10. The other leg of the crank arm 190 has connected thereto a drag link 194 whose lower end is connected to one end wall of the stone receptacle 48 adjacent the forward edge thereof. It will be noted that when the lever 166 is pulled forwardly the drag link 194 is moved upwardly with the resultant tipping of the stone receptacle 148 to dump the stones contained therein out through the open rear side 150.

Referring now to Figures 11 and 12 in particular, it will be seen that there is illustrated one of the tines 68 of the rake 32. The individual tine 68 includes a shaft portion 196 which terminates in a square cross-section upper end 198 of a reduced size. The upper end 198 of the tine 68 passes through the transverse portion of the U-shaped front portion 66 and is secured in place by conventional fasteners including cotter pins. The lower end of the shaft 196 is provided with a wide blade portion 200 which extends transversely of the longitudinal axis of the stone picker and is adapted to engage stones for moving the same forwardly.

Referring to Figure 2 in particular, it will be seen that there is illustrated a rear portion of a tractor, which is referred to in general by the reference numeral 202. Mounted on the rear of the tractor 202 is a generally L-shaped support member 204 which has a horizontal portion 206 connected at its lower end to a bracket 208 carried by the tractor frame. The L-shaped support member 204 also includes a vertical standard 210 which is square in cross section and faced adjacent the upper end thereof by a rearwardly and upwardly extending diagonal brace 212 connected to the tractor 202. Mounted on the upper end of the standard 210 is a hoist structure, which is referred to in general by the reference numeral 214. The hoist structure is operated by a crank 216 and has a downwardly extending flexible member 218. Mounted on the standard 210 for vertical movement is a draw bar 220 which has a bifurcated rear portion 222. The forward end of the draw bar 220 is provided with a square bore 224 therethrough through which passes the standard 210. The draw bar 220 also includes a ring 226 projecting upwardly from the upper side thereof, the lower end of the flexible member 218 being secured thereto. The tongue member 26 of the frame 10 of the stone picker is positioned in the bifurcated rear portion 222 of the draw bar 220 and is connected thereto for pivotal movement by a draw pin 228. It will be understood that the draw pin 228 passes through aligned bores 230 in the draw bar 220 and the aperture 28 in the tongue member 26.

Inasmuch as the front portion of the stone picker is supported directly by the tow bar 220, it will be seen that the plate 58 and the runners 62 may be adjusted with respect to the surface of the ground 64 by raising or lowering the tow bar 220 through the use of the winch 214.

While the means for locking and tipping the stone receptacle 148 has been described as being mounted along one side thereof and carried by the outer frame section 12, it will be understood that if it is so desired the pivot pins for the crank arms 176 and 192 may extend transversely across the rear of the frame 10 and be connected to similar tipping and unlatching structure mounted at the other end of the stone receptable 148. By providing such a structure at both ends of the stone receptacle 148 no twisting action will result.

It will be understood that as the stone picker, which is the subject of this invention, is drawn forwardly along the ground 64 by the tractor 202 the plate 58 digs into the ground and stones are moved upwardly thereon. The stones are then engaged by the tines 68 of the rakes 32 and moved upwardly upon the forward end of the conveyors 30. The stones, which are of sufficient size to be supported by the bars 54 and 56 of the conveyors are then moved rearwardly and dumped into the stone receptacle 148. When the stone receptacle 148 has been filled, the stones are dumped therefrom by utilizing the levers 164 and 166. It will be understood that the levers 164 and 166, and the handle 124 for actuating the control shaft 122 are so positioned whereby they may be manipulated by a driver of the tractor 202 while seated on the seat thereof.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A mechanical rake for use in a stone picker comprising a supporting frame, a fork including depending tines, a drag link rigidly secured to said fork and extending therefrom, said drag link having an end remote from said fork, drive means carried by said supporting frame secured to said drag link end for imparting oscillatory movement to said drag link and said fork, a guide rigidly carried by said supporting frame adjacent an intermediate portion of said drag link, said drag link having a roller, said guide having a lower track and an overlying upper track, said roller sequentially engaging said lower track upon movement towards said drive means and engaging said upper track upon movement away from said drive means whereby said fork is alternately raised and lowered in response to movement thereof relative to said drive means.

2. A mechanical rake for use in a stone picker comprising a supporting frame, a fork including depending tines, a drag link rigidly secured to said fork and extending therefrom, said drag link having an end remote from said fork, drive means carried by said supporting frame secured to said drag link end for imparting oscillatory movement to said drag link and said fork, a guide rigidly carried by said supporting frame adjacent an intermediate portion of said drag link, said drag link having a roller, said guide having a lower track and an overlying upper track, said roller sequentially engaging said lower track upon movement towards said drive means and engaging said upper track upon movement away from said drive means whereby said fork is alternately raised and lowered in response to movement thereof relative to said drive means, said upper track having a hinged end section disposed remote from said fork, said end section normally engaging said lower track as a continuation thereof to facilitate transfer of said roller from said lower track to said upper track, said end section being movable upwardly relative to said lower track to permit movement of said roller under said upper track.

3. A mechanical rake for use in a stone picker comprising a supporting frame, a fork including depending tines, a drag link rigidly secured to said fork and extending therefrom, said drag link having an end remote from said fork, drive means carried by said supporting frame secured to said drag link end for imparting oscillatory movement to said drag link and said fork, a guide rigidly carried by said supporting frame adjacent an intermediate portion of said drag link, said drag link having a roller, said guide having a lower track and an overlying upper track, said roller sequentially engaging said lower track upon movement towards said drive means and engaging said upper track upon movement away from said drive means whereby said fork is alternately raised and lowered in response to movement thereof relative to said drive means, said upper track having a hinged end section disposed remote from said fork, said end section normally engaging said lower track as a continuation thereof to facilitate transfer of said roller from said lower track to said upper track, said end section being movable upwardly relative to said lower track to permit movement of said roller under said upper track, said upper track having an end adjacent said fork terminating abruptly to facilitate falling said roller from said upper track onto said lower track and to effect a sudden lowering of said fork.

References Cited in the file of this patent

UNITED STATES PATENTS

| Number | Name | Date |
|--------|------|------|
| 946,273 | Richards | Jan. 11, 1910 |
| 965,115 | Moore | July 19, 1910 |
| 1,593,952 | Ribbans | July 27, 1926 |
| 2,553,240 | Cintula | May 15, 1951 |
| 2,598,223 | Chase | May 27, 1952 |